United States Patent Office 3,076,262
Patented Feb. 5, 1963

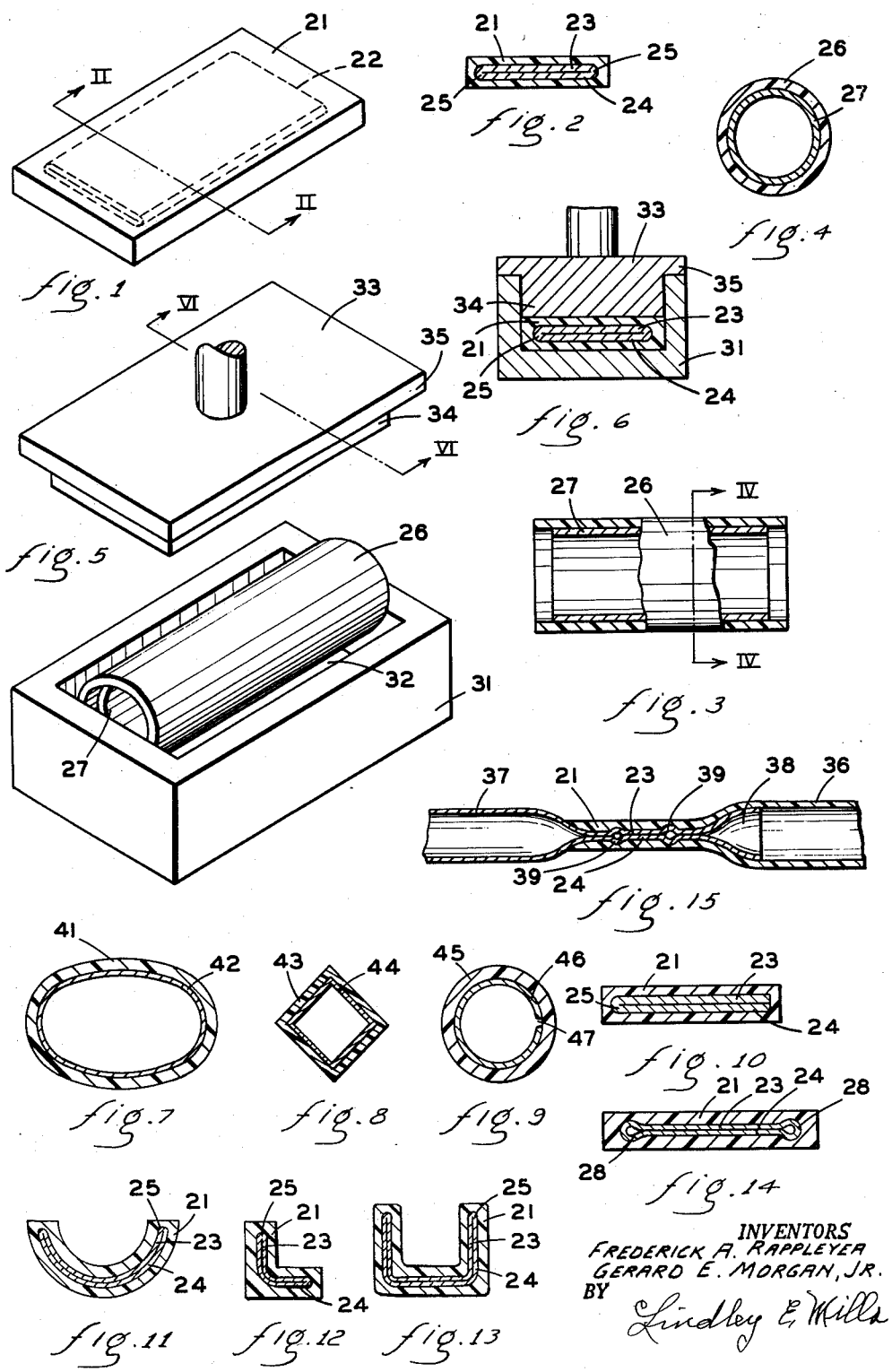

3,076,262
METHOD OF MAKING A METAL REINFORCED RESINOUS STRUCTURE
Frederick A. Rappleyea, Oak Park, and Gerard E. Morgan, Jr., Glenview, Ill., assignors to John T. Riddell, Inc., Chicago, Ill., a corporation of Illinois
Filed Oct. 21, 1957, Ser. No. 691,394
4 Claims. (Cl. 29—517)

This invention relates to a reinforced structure, particularly to a metal reinforced resinous structure. This application is a continuation-in-part of application Serial No. 619,429, filed October 31, 1956, now U.S. Patent No. 2,928,102, and of application Serial No. 562,130, filed January 30, 1956, now U.S. Patent No. 2,785,406, of which latter application Serial No. 619,429 is also a continuation-in-part.

In the plastics art it is frequently desirable to provide a resinous structure, such as a flat or curved plate, an angle or a channel, which is characterized by a greater ratio of stiffness and strength to weight or volume than would be possible when making the structure entirely from the resinous substance involved. Structural members, such as those mentioned above, are often required to bear flexing loads but under conditions where it is desirable that a minimum amount of flexing be caused by the load. Although essentially any desired resistance to flexing under a particular load can be imparted to the structure by increasing the amount of resinous substance used in making it, this is often an undesirably costly procedure and, furthermore, the bulk and weight of the structure are often increased undesirably. It is also often desirable that such structures have as high a resistance to breakage under impact as possible and this is often difficult to obtain without using an undue amount of resinous substance in making the structure. This is sometimes particularly true of structures which are formed by hot-working the resinous substance. Regions of maximum deformation of the resin are prone to be regions of weakness in the finished article and undesirably subject to fracture under impact. It is, therefore, often desirable to reinforce a resinous structure to increase its resistance to flexure under load and to impact without increasing unduly its weight or bulk. Many means for reinforcing resinous structures have been suggested and used widely but in general they each leave much to be desired in the way of ease of manufacture, cost, weight reduction and other important factors.

In the parent applications there has been described in considerable detail and claimed the manufacture of a resinous tubular face guard for use with head-protective helmets which consists of an arcuate tubular resinous structure having an anchor plate formed at each of its ends by pressing and flattening the heated ends of the tube in a mold. The anchor plates are formed so as to be useful in attaching the guard to the dependent jaw sections of a helmet shell. In a preferred modification of the face guard described the anchor plates are reinforced by inserting a snugly fitting metal tube, e.g. a thin-walled tube of brass or other lightweight, high strength metal, in the ends of the tubular resinous blank from which the face guard is formed. The blank is then heated to the requisite degree and bent into its arcuate shape and its ends retaining the metal tubes are flattened under pressure in a mold to form the anchor plates. Each anchor plate thus formed consists of a flattened resinous plate of proper configuration and of essentially uniform thickness and in which the metal tubular insert has been flattened essentially completely to form a pair of metal plates in face-to-face contact with one another and joined together along opposite edges of the plates. The metal reinforcement is surrounded entirely in a direction transverse to its longitudinal axis, i.e. transverse to the axis of the bore of the tubular metal insert, by an essentially uniform layer of resinous substance.

By locating the metal insert in the resinous tube so that its outer end is removed a short distance from the end of the tube, the metal reinforcement is also covered completely by resin along its outer end in the finished anchor plate. The inner end of the metal reinforcement can also be enclosed completely with the resinous substance if the tubular insert is sufficiently short with respect to the length of the finished anchor plate to permit the molding procedure to press the walls of the resinous tube completely together beyond the inner end of the reinforcement. Alternatively, by making the metal tubular insert of a suitable length it can be made to project beyond the anchor plate in the finished face guard into the arcuate tubular section of the guard for any desired distance. Under such conditions it follows the contour of the deformed but not completely collapsed sections of the guard and serves to reinforce these sections to a considerable extent.

It has also been disclosed in the parent applications that the method just described as being employed in reinforcing the anchor plates of the face guard referred to is of general application and that its utility is not limited to the making of face guards alone. According to the general method for preparing a reinforced resinous structure, with which the present application is particularly concerned, a hollow resinous blank of suitable configuration and composition is provided, as is also a hollow metal insert which can be inserted into the hollow resinous blank. The insert is inserted into the blank and the assembly is then heated to the working temperature of the resinous composition but preferably not to a temperature high enough to weaken its strength characteristics after subsequent cooling. Alternatively, the resinous blank can be first heated and the metal insert then inserted into it but in such instances it is often advisable to also heat the metal insert so that it will not chill the surfaces of the resinous blank with which it comes into contact. In any event the heated assemblage of resinous blank and metal insert is then compressed, usually in a mold of suitable size and configuration, to flatten both the insert and the resinous blank to form an essentially solid structure free of internal voids. In the thus formed structure the flattened metal insert is in the form of a pair of metal reinforcing plates in essentially face-to-face contact which are joined along at least one of their common edges and which are entirely surrounded by the resinous composition in at least one direction.

The invention can be best understood by reference to the accompanying drawing wherein, in the interest of clarity, certain features are shown on a somewhat exaggerated scale and wherein FIGURE 1 is an oblique plan view of a reinforced flat plate which can be made by the method of the invention, the entirely enclosed metal reinforcement being shown in dotted outline;

FIGURE 2 is a sectional elevation taken along the line II—II of FIGURE 1;

FIGURE 3 is an elevation, partially in section, of a tubular resinous blank and a tubular metal insert assembled in condition ready for forming the structure of FIGURE 1;

FIGURE 4 is a sectional elevation taken along the line IV—IV of FIGURE 3;

FIGURE 5 is a diagrammatic sketch of a mold suitable for forming the structure of FIGURE 1 from the assemblage of FIGURE 3 showing the mold in open position and the assemblage of FIGURE 3 in position in the mold;

FIGURE 6 is a sectional elevation taken along the line VI—VI of FIGURE 5 but with the mold in closed position and showing the structure of FIGURE 1 still in the mold.

FIGURES 7, 8 and 9 are additional illustrations of assemblages of resinous blanks and metal inserts which can be employed in making reinforced resinous structures according to the method of the invention;

FIGURES 10, 11, 12, 13 and 14 are sectional elevations of additional types of reinforced structural members which can be made employing the method of the invention;

FIGURE 15 is a sectional elevation of still another structure which can be made employing the method of the invention and showing several novel features which can be incorporated in the finished structure by suitable modification of the process.

Referring to FIGURES 1 and 2, there is shown a flat resinous plate 21 reinforced with a metal reinforcement shown in dotted outline at 22 of FIGURE 1. The metal reinforcement, which in this instance is enclosed completely within the body of resin, consists of a pair of flat metal plaes, 23 and 24 of FIGURE 2, which are in face-to-face contact with one another and which are joined along their opposite edges as at 25.

The structure of FIGURES 1 and 2 is made conveniently by first providing the assemblage of FIGURES 3 and 4 which includes a tubular, conveniently circular, thermoplastic or thermosetting resinous blank 26 of suitable dimensions and a correspondingly shaped tubular metal insert 27 which can be slipped into the blank 26. In the modification of FIGURE 3 the insert 27 is shown as being somewhat shorter than the blank 26 so that when it is centered in the blank it falls short of each end of the blank by a suitable distance, the reason for which will be apparent as the description proceeds. It is convenient, but not essential, for the external diameter of the insert 27 and the internal diameter of the blank 26 to be related to one another in such a manner that the insert fits the blank snugly and is thus not likely to become displaced from its desired position during subsequent manipulations of the assemblage.

Although the assemblage of resinous blank and metal insert can be pressed to the desired configuration in any desired manner and using any suitable apparatus, there is shown schematically in FIGURES 5 and 6 a mold suitable for converting the assemblage of FIGURE 3 to the flat reinforced structure of FIGURE 1. It is, of course, understood that prior to pressing the assemblage in the mold it should be heated at a temperature at which the resinous blank can be deformed in the desired manner without danger of cracking and breaking when pressed flat. Generally speaking, it is inadvisable to heat the resinous substance at a temperature much above its working temperature because the strength properties of many resinous substances are injured by excessive heating so that the formed and subsequently cooled structure is weakened accordingly. Heated molds can, of course, be employed if desired and other conventional or standard modifications of molding procedures can be employed where convenient.

As illustrated in FIGURES 5 and 6, the mold consists of a female member 31 having a suitable cavity, e.g. a rectangular cavity, 32 which cooperates with a male member 33 having a rectangular block 34 which just fits the rectangular cavity 32. The extent to which the block 34 enters into the cavity 32 can be determined by shoulders 35 on the member 33 which engage the upper surface of the female member 31. The depth of the cavity 32 and the thickness of the block 34 are determined by the thickness of the rectangular structure which is desired, the amount of metal and resinous material in the heated assemblage being adjusted to fill essentially the mold cavity when the mold is closed.

The heated assemblage of FIGURE 3 is placed carefully in the mold cavity 32, preferably with the longitudinal axis of the assemblage lying along the central line of the cavity so that the metal tube can be flattened easily without danger of buckling. The mold is then closed, whereupon the structure of FIGURES 1 and 2 is produced as shown in FIGURE 6. The structure is finally ejected from the mold in conventional fashion, either before or after cooling, depending upon the particular resinous composition employed and the conditions prevailing within the closed mold.

Although the procedure has thus far been described with respect to a circular resinous tubular blank and a circular metal insert, it should be pointed out that blanks and inserts of other shapes can be employed with equal facility. Thus, as is shown in FIGURE 7, a resinous blank can be in the form of a tube 41 with an oval cross section and the metal insert 42 can be of corresponding cross sectional shape. It is even sometimes convenient, as illustrated in FIGURE 8, to provide a resinous blank 43 and metal insert 44 as square, rectangular or other angularly shaped tubes. In the case of an assemblage of such angularly shaped tubes it is often advisable to place the assemblage in the mold in such a position that compression is in a direction along a diagonal of the square or rectangle to provide for smooth flattening of the metal insert without buckling.

The invention has thus far been described with respect to tubular inserts having a wall which is continuous circumferentially. However, it is entirely possible and sometimes convenient to employ an assemblage, such as that illustrated in FIGURE 9, wherein the insert 46 is split longitudinally as at 47. Such split inserts are sometimes of convenience because they can be formed in such a way as to engage the inner surface of a resinous blank 45 frictionally without the necessity of such careful attention to tolerances of the inside diameter of the blank and the outside diameter of the insert as might otherwise be necessary. Thus the insert 46 of FIGURE 9 can be formed with an external diameter somewhat larger than the internal diameter of the blank 45 and with a relatively wide slot 47 longitudinally in its wall so that when it is inserted in the blank it is under tension which presses it into firm engagement with the inner wall of the blank and easy displacement of the insert with respect to the blank is prevented. Employing a split insert, as shown in FIGURE 9, it is generally convenient to place the assemblage in the mold in a position such that the slit in the wall of the insert will occupy a position at which the insert wall would be bent back completely upon itself if it were continuous. This is illustrated in FIGURE 10 which corresponds precisely to FIGURE 2 except for the fact that the plates 23 and 24 are joined at 25 along only one edge of each and are not joined to one another along their opposite edges.

It should be mentioned that the process of the invention is adapted to the preparation of reinforced structures other than flat plates. The shape of the reinforced structure which can be produced is limited only by the form of the unpressed assemblage which can be formed, by the shape of the mold in which the pressing step is carried out and by the shape into which the resinous blank and metal insert can be pressed without undue buckling and drawing. Thus, as shown in FIGURE 11, structures of essentially semi-annular cross-sectional area can be produced. Angles and channels, such as those illustrated in FIGURES 12 and 13, can be produced with equal facility employing properly shaped male and female mold members. Elongated structures can be produced continuously utilizing suitably formed shaping rolls, if desired.

It has been noted previously that the insert employed in forming the reinforced resinous article is of metal and that during the pressing process it often becomes collapsed essentially completely. It is essential that the two reinforcing plates thus formed be joined at least along one edge of each as in FIGURE 10, usually along their opposite edges as illustrated in FIGURES 2, 11, 12 and 13. When the insert is to be flattened completely, it is essential that it be of a composition such that it will not crack or split when bent sharply upon itself, e.g. as at 25 of FIGURES 2 and 10. For this reason inserts formed of metals of considerable ductility, such as brass, suitable alloys of aluminum, iron or copper and the like, are generally preferred.

It should be pointed out, however, that it is not entirely essential that the metal insert be flattened completely along its edges during the pressing operation. Thus the structure of FIGURE 14 can be formed in essentially the same manner as that described previously for the formation of the structure of FIGURE 2 except that in this instance the mold is closed insufficiently far to effect complete flattening of the insert. Under such conditions it is found that the two reinforcing plates 23 and 24 instead of being pressed completely together entirely to their edges are joined along their edges by a curved section of the metal sheet which forms a small hollow bead 28 running along the edges of the two plates joining them together, but with the resinous composition 20 of the plate extending completely around the metal beads and plates in the direction transverse to the longitudinal axes of the beads. When employing this modification of the invention it is possible to use metal inserts of a great deal more rigidity and brittleness than would otherwise be the case, and still avoid cracking or breaking of the metal, with a corresponding increase in stiffness of the finished structure. Furthermore, the presence of the beads along the two edges of the plates adds considerably to the stiffness of the structure.

Various other modifications of the process and product of the invention will be apparent in view of the foregoing description. As illustrative of certain of such modifications, there are shown in FIGURE 15 a resinous tube 36 and a metal tube 37 joined together by a region comprising a metal reinforced resinous part of the structure. The structure of FIGURE 15 can be prepared readily by first preparing an assemblage after the fashion of FIGURE 3 with the metal tube 37 inserted for a suitable distance into one end of the resinous tube 36 with each of the two tubes projecting for a suitable distance beyond the region of overlap. Upon heating the assemblage at the working temperature of the resinous composition and pressing the central part of the region of overlap of the two tubes together in a mold or between a pair of parallel bars of suitable width, the central part of the region of overlap is deformed to form a reinforced flat structure essentially the same as that of FIGURES 1 and 2 but with the flat structure merging smoothly at its respective ends into the undeformed parts of the resinous and metal tubes. It will be noted in FIGURE 15 that the end 38 of the metal tube which projects farthest into the resinous tube extends beyond the region of complete flattening of the tubes and remains flared at its end so that it follows closely the contour of the partially collapsed regions of the resinous tube and thus serves to strengthen this region of the structure. It will also be noticed that the surface of the compressed end of the resinous tube merges smoothly into the surface of the incompletely collapsed section of the metal tube and leaves no abrupt shoulder or break in the surface of the article. The entirely flattened section of the two tubes comprises the two metal reinforcing plates 23 and 24 joined along opposite edges and surrounded entirely in a direction transverse to the longitudinal axes of the tubes 36 and 37 by the resinous composition.

FIGURE 15 also illustrates another method which can be employed for increasing the stiffness of the reinforced resinous structure. This is effected by first rolling one or more corrugations outward in the wall of the metal insert. When such an insert is inserted into a resinous tubular blank and the heating and pressing procedure followed as described previously, the corrugations are more difficult to flatten completely in the press than is the rest of the insert and they, therefore, remain as more or less raised corrugations 39 extending outward into the resinous body across the two reinforcing plates in a direction transverse to the longitudinal axes of the tubes. By combining this modification with the modification illustrated in FIGURE 14, a high degree of stiffness of the reinforced structure in both directions is obtained with the employment of an insert of minimum wall thickness.

The resinous blank employed in forming the reinforced resinous article of the invention can be of any suitable composition formable under heat and pressure such that the blank can be formed to provide a suitably rigid resinous body in the manner described. Thermoplastic resinous compositions can be employed conveniently with the forming operation being carried out at a suitable working temperature for the particular composition involved. It is also often convenient to employ thermosetting compositions which have previously been partially polymerized to the extent that they can be formed into tubes and other form-substaining articles but which are still capable of being deformed when heated and which can be "after set" to a non-thermoplastic composition in the mold. Resinous compositions comprising suitable pigments and fillers can be employed in making the blanks to impart suitable decorative and physical properties to the reinforced article.

We claim:

1. The method for forming a rigid metal-reinforced resinous structure which includes: providing an assemblage of a suitably dimensioned rigid resinous tubular blank and a metal tubular insert within at least a section of the blank, the resinous composition from which the blank is formed being capable of being hot-worked at an elevated hot-working temperature, being form-sustaining at the hot-working temperature and, after hot-working and subsequent cooling, being a rigid composition; heating said resinous blank in the region of overlap of said blank over said insert; pressing the heated assemblage between surfaces to collapse the metal tube and form a pair of plates in essentially face-to-face contact with one another surrounded completely in at least one direction by the heated resinous composition; and thereafter cooling the hot-pressed assemblage to cause the resinous composition to become rigid.

2. The method for forming a reinforced resinous structure which includes: providing a suitably dimensioned blank of a rigid thermoplastic resinous composition formable under heat and pressure; providing a metal tubular insert for the blank of suitable wall thickness and having an outside diameter to cause the insert to engage frictionally the inner surface of the blank when inserted therein; inserting the insert at least partially into the blank; heating a region of overlap of the blank and insert at a working temperature of the resinous composition; pressing the heated region between surfaces to collapse it and form a reinforced resinous structure consisting of a pair of metal plates of suitable configuration in essentially face-to-face contact joined together along at least one edge and surrounded entirely in at least one direction by a layer of the resinous composition; and thereafter cooling the hot-pressed region to cause the resinous composition to resume its original rigid character.

3. The method of claim 2 wherein the heated region is pressed sufficiently to cause the metal plates to contact one another essentially to their joined edges.

4. The method of claim 2 wherein the heated region is pressed insufficiently to cause the metal plates to contact one another entirely to their joined edges whereby they remain connected by a hollow bead along their edges.

References Cited in the file of this patent

UNITED STATES PATENTS

| | | |
|---|---|---|
| 2,276,571 | Grypma | Mar. 17, 1942 |
| 2,286,759 | Patnode | June 16, 1942 |
| 2,595,695 | Packer et al. | May 6, 1952 |
| 2,600,220 | Doelker et al. | June 10, 1952 |
| 2,698,991 | Mesick | Jan. 11, 1955 |
| 2,736,957 | Heering | Mar. 6, 1956 |
| 2,803,695 | Woolley | Aug. 20, 1957 |
| 2,852,840 | Harvey | Sept. 23, 1958 |
| 2,864,159 | Doering et al. | Dec. 16, 1958 |